US008745106B2

(12) United States Patent
Rowley

(10) Patent No.: US 8,745,106 B2
(45) Date of Patent: Jun. 3, 2014

(54) NUMERIC IDENTIFIER ASSIGNMENT IN A NETWORKED COMPUTER ENVIRONMENT

(75) Inventor: Peter Rowley, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 230 days.

(21) Appl. No.: 11/468,475

(22) Filed: Aug. 30, 2006

(65) Prior Publication Data

US 2008/0059475 A1    Mar. 6, 2008

(51) Int. Cl.
*G06F 12/00* (2006.01)
*G06F 17/30* (2006.01)

(52) U.S. Cl.
USPC ......................................................... 707/830

(58) Field of Classification Search
USPC .............. 707/1, 10, 104.1; 709/209, 223, 226
See application file for complete search history.

(56) References Cited

U.S. PATENT DOCUMENTS

| | | | | |
|---|---|---|---|---|
| 5,371,892 A * | 12/1994 | Petersen et al. | ................... | 713/1 |
| 5,394,556 A * | 2/1995 | Oprescu | ........................ | 709/220 |
| 5,884,322 A * | 3/1999 | Sidhu et al. | ............................. | 1/1 |
| 5,983,282 A * | 11/1999 | Yucebay | ........................ | 709/249 |
| 6,324,571 B1 * | 11/2001 | Hacherl | ........................ | 709/208 |
| 6,457,053 B1 * | 9/2002 | Satagopan et al. | ............ | 709/226 |
| 6,477,543 B1 * | 11/2002 | Huang et al. | ........................... | 1/1 |
| 7,058,730 B2 * | 6/2006 | Harbin | ........................... | 709/249 |
| 7,240,211 B2 * | 7/2007 | Hillhouse | ..................... | 713/182 |
| 2001/0037411 A1 * | 11/2001 | Claar | ............................ | 709/315 |
| 2001/0047395 A1 * | 11/2001 | Szutu | ............................. | 709/217 |
| 2001/0052029 A1 * | 12/2001 | Harbin | ........................... | 709/251 |
| 2002/0027922 A1 * | 3/2002 | Nicoll et al. | .............. | 370/395.63 |
| 2003/0138043 A1 * | 7/2003 | Hannuksela | ............. | 375/240.08 |
| 2003/0227487 A1 * | 12/2003 | Hugh | ............................ | 345/777 |
| 2003/0233336 A1 * | 12/2003 | Clark | ................................. | 707/1 |
| 2004/0230619 A1 * | 11/2004 | Blanco et al. | ................. | 707/200 |
| 2005/0021702 A1 * | 1/2005 | Rangarajan et al. | .......... | 709/223 |
| 2005/0078681 A1 * | 4/2005 | Sanuki et al. | .............. | 370/395.5 |
| 2006/0085524 A1 * | 4/2006 | Lee | ................................. | 709/220 |
| 2007/0214146 A1 * | 9/2007 | Mitaru | ............................ | 707/10 |
| 2007/0239655 A1 * | 10/2007 | Agetsuma et al. | ................ | 707/1 |
| 2008/0098009 A1 * | 4/2008 | Rowley | ........................ | 707/100 |

OTHER PUBLICATIONS

Arithmetic progression, May 9, 2008, Wikipedia, pp. 1-2.*
D. S. Malik, "C++ Programming: From Problem Analysis to Program Design", 2004, Thomson / Course Technology, Second Edition, pp. 398-399.*

* cited by examiner

*Primary Examiner* — Taelor Kim
(74) *Attorney, Agent, or Firm* — Lowenstein Sandler LLP

(57) ABSTRACT

Embodiments of the present invention provide a system and method of assigning unique identifiers in a multi-master directory service. In particular, each server in the system assigns numeric user identifiers in a linear fashion that compliments the series of user identifiers assigned by the other servers. In particular, a first server is selected and assigned a first starting number. Each subsequent server is then assigned their own starting series number by incrementing from the first starting number. Then, all servers are assigned an additive, which is an integer greater than or equal to the number of servers in the system. Each server then generates its own series of unique numeric identifiers based on its own starting series number and the additive.

8 Claims, 4 Drawing Sheets

NUMERIC IDENTIFIER ASSIGNMENT IN A NETWORKED COMPUTER ENVIRONMENT

FIELD OF THE INVENTION

The present invention relates to networked computer systems and, more particularly, to a system and method for assigning unique identifiers in a networked computer system.

BACKGROUND OF THE INVENTION

Computer systems typically include two or more computers networked together to allow the sharing of applications, resources, services and information by a number of users. Applications running in this de-centralized environment need information about the system from time to time, including, for example, information about users, host name resolution, passwords, and file locations. Typically, a network service known as a "directory service" (or "name service") is used to store, maintain, and provide this information to clients of the system. A directory service typically keeps track of resources on a network and makes this information available to users and applications. For example, when a user logs on, the login program on the local computer may communicate with the directory service to check the user's username, password and other authentication information. The local computer may further communicate with the directory service to obtain information about the user's permissions in the network.

Typically, a directory service includes a database where the directory data is stored, as well as programs for administering the database and programs for communicating with client applications. The directory service may be implemented on one or more servers on the network.

A directory service that utilizes multiple master servers may be implemented in what is known as a loosely coupled distributed environment. In such a system, each server independently creates and modifies entries of the directory service independent of the other servers. The data is later replicated and synchronized among the master servers of the directory service.

To keep track of users and groups of users who are members of the directory service, it is helpful for the directory service to assign each user and each group a unique numeric identifier. For example, in the well known POSIX directory service schema of UNIX, users and groups of users are assigned a unique numeric identifier for each user and group.

Unfortunately, in a loosely coupled directory service (i.e., a service with including multiple masters), it is difficult to guarantee the uniqueness of any numeric identifier assignment. For example, two master servers may assign the same number to different entities without realizing there is a conflict because data will be synchronized after the conflicting assignments have been made. Known systems attempt to resolve conflicts by using timestamps and simple conflict resolution rules. However, many situations require manual intervention of a system administrator to resolve a conflict. Accordingly, most loosely coupled directory services require the system administrator to manually assign numeric identifiers to users and groups.

It would therefore be desirable to provide methods and systems that assist the user in assigning unique numeric identifiers to users and groups associated with a loosely coupled multi-master directory service.

SUMMARY OF THE INVENTION

In accordance with one feature of the invention, a method of assigning numeric unique identifiers in a loosely coupled multi-master directory service is provided. The directory service comprises a set of s servers, wherein s is the total number of servers in the set of servers. A first server in the set of servers is selected and a starting number for the first server is determined. Each of the other servers in the set of servers is then assigned their own starting number based on the starting number for the first server. An additive to the set of servers is then assigned, wherein the additive is an integer greater than or equal to s. Each server then generates numeric unique identifiers based on their own starting number and the assigned additive, wherein tie numeric unique identifiers is equal to the additive added to the unique identifier previously assigned by that server.

Additional features of the invention will be set forth in part in tie description which follows, and in part will be obvious from the description, or may be learned by practice of the invention. The features of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with tie description, serve to explain the principles of the invention.

DESCRIPTION OF THE EMBODIMENTS

Embodiments of the present invention provide a system and method of assigning unique identifiers in a multi-master directory service. In particular, each server in the system assigns numeric user identifiers in a linear fashion that compliments the series of user identifiers assigned by the other servers. In particular, a first server is selected and assigned a first starting number. Each subsequent server is then assigned their own starting series number equal by incrementing from the first starting number. Then, all servers are assigned an additive, which is an integer greater than or equal to the number of servers in the system.

Reference will now be made in detail to the exemplary embodiments of the invention, an example of which is illustrated in the accompanying drawings. Wherever possible, the same reference numbers will be used throughout the drawings to refer to the same or like parts.

Figure 1:
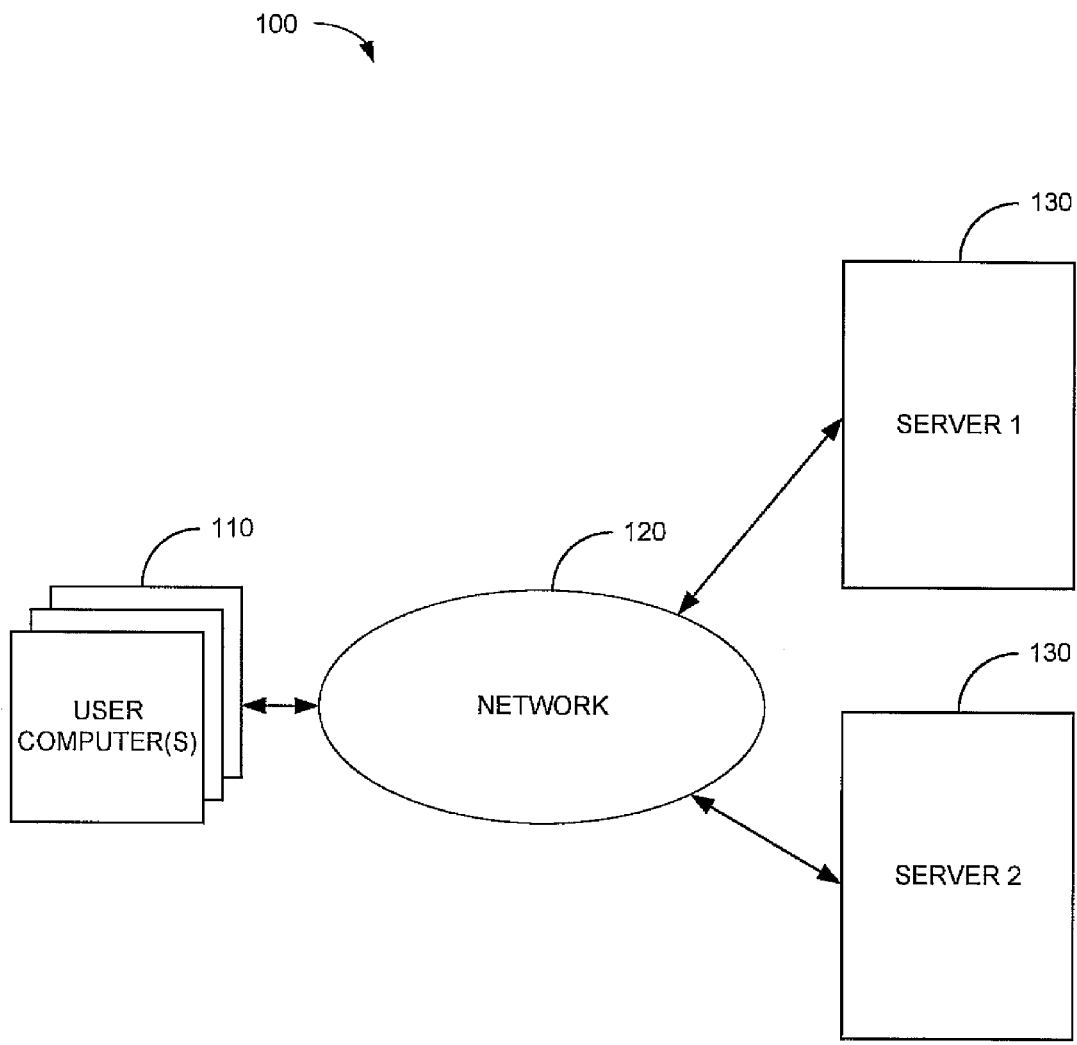
FIG. 1 depicts a block diagram of an exemplary networked computer system 100, in accordance with systems and methods consistent with the present invention

FIG. 1 depicts a block diagram of an exemplary networked computer system 100 that utilizes a loosely coupled multi-master directory service. As shown, computer system 100 includes a plurality of user computers 110 interconnected via a data communications network 120. In addition, system 100 comprises a loosely coupled multi-master directory service that is implemented on servers 130.

The user computers 110 may be implemented with devices that are well known to those skilled in the art, such as personal computers, laptops, personal digital assistants, cellular phones, etc. Each user computer 110 includes, among other components, a processing unit and a number of memory storage devices. In typical cases, storage devices include, for example, any type of permanent or semi-permanent storage (e.g., hard disc drives, memory cards, and the like) and may be used to store any number of software programs or data files. An operating system installed on each user computer 110 provides direct control and management of hardware and basic system operations and application programs.

Data communication network 120 provides a communication infrastructure that couples the components of system 100. For example, user computers 110 may be linked to each other and to the directory service servers 130 via data communication network 120. Examples of network 120 may include the Internet or other similar data networks, such as private WANs, LANs, and the like. Network 120 may be implemented with well known network elements, such as routers, hubs, switches, and the like.

Figure 2:
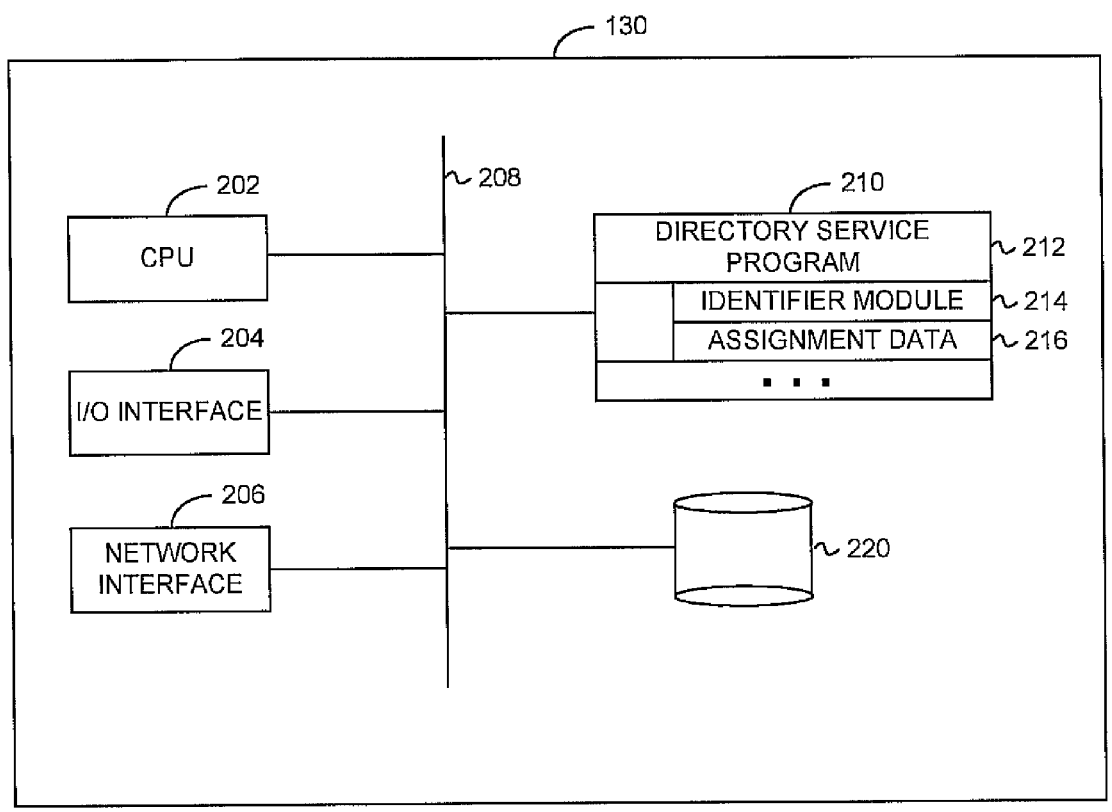
FIG. 2 depicts a block diagram of an exemplary server 130, in accordance with systems and methods consistent with the present invention.

FIG. 2 depicts a block diagram of one of the exemplary servers 130 of the directory service. Server 130 may be embodied as a data processor, such as a computer, that functions to support the directory service. In particular, server 130 may include at least one central processing unit (CPU) 202, an I/O interface 204, a network interface 206, memory 210, and database 220 for storing the database of directory information. CPU 202 executes instructions associated with the applications contained in memory 210 and transmits results to other subsystems in server 130 over a high speed interconnect or data bus 208. I/O interface 204 is an interface used to couple server 130 with devices such as a keyboard, a mouse, a display device, and any other I/O device useful that may be used by a system administrator or other user. Network interface 206 is used to communicate with network 120 (FIG. 1).

Memory 210 includes in one embodiment: a directory service program 212 having program instructions that when executed support the directory service. The directory service may offer a number of types of services, such as user information, group information, host name information, file system mount point information, etc. The servers 130 of the directory service may coordinate with each other according to a number of directory service protocols such as LDAP, Hesiod, NIS, etc. The directory service may be implemented using multiple directory service platforms and may be compatible with a number of communication protocols.

Directory service program 212 may have several functions. It can continuously maintain and update database 220. Directory service program 212 also can handle requests for directory services, i.e., for directory information. A typical request is received by network interface 206 over network 120 (FIG. 1) via a standard communication protocol. Directory service program 212 can query database 220 for the requested directory information and communicate the result back to a requesting user computer 110 (FIG. 1). The process of obtaining directory information entails two-way communication between a requesting user and directory service program 212.

In one embodiment, directory service program 212 includes an identifier module 214 for assigning unique identifiers to users and groups, and assignment data 216 for storing data associated with the assignment. For example, in many operating systems, such as UNIX, LINUX, etc., numeric user ids (UID), not the user name or login id of the user, are used to track the operations and permissions of the user, such as process ownership, file ownership, file sharing, and the like. Typically, numeric UIDs are assigned from a pool of numbers (signed or unsigned) that are 32-bit, 64-bit, and so on. For example, in recent versions of LINUX, the numeric UID may be assigned from a signed 32-bit integer number. As another example, many UNIX implementations support numeric UID lengths of 32 bits (maximum value 4294967295) while others, most notably Linux, still only support 16-bit UIDs.

Figure 3:
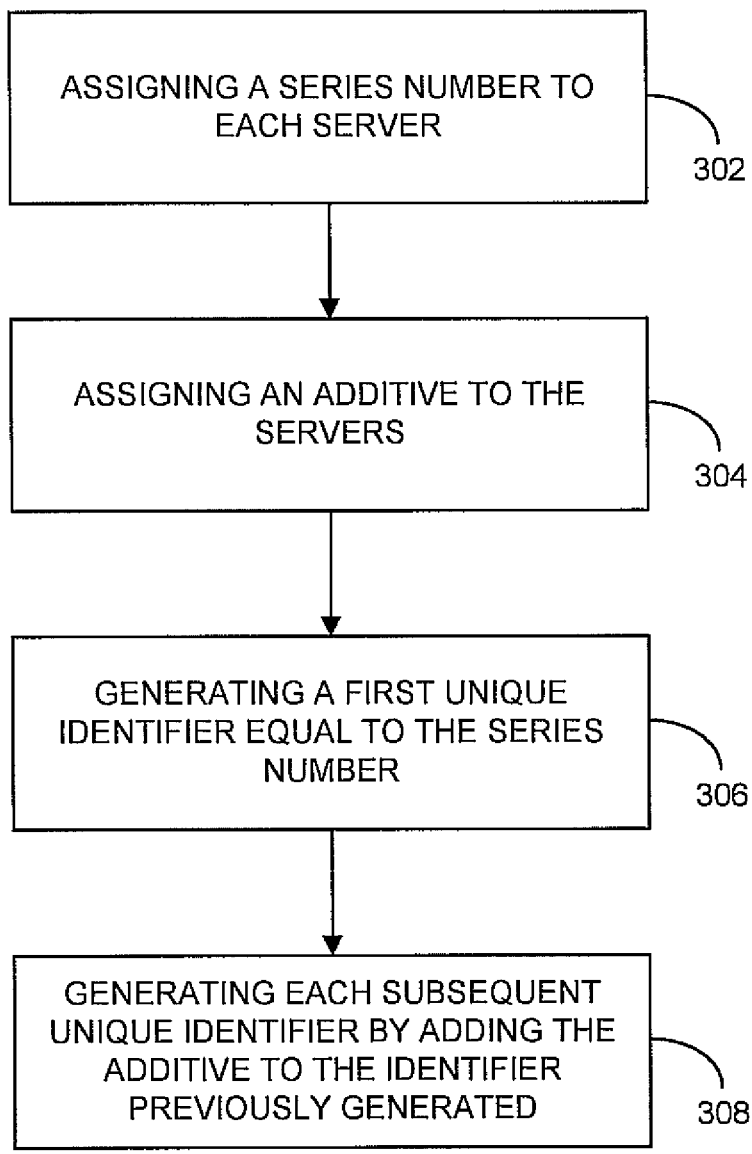
FIG. 3 depicts a flow diagram of an exemplary process for assigning unique identifiers, in accordance with systems and methods consistent with the present invention.

FIG. 3 depicts a flow diagram of an exemplary process for assigning unique identifiers, in accordance with systems and methods consistent with the present invention. In general, the servers of the multi-master directory service are configured to assign unique numeric identifiers in a linear series fashion that compliment each other. In order to ensure that the numeric identifiers are globally unique, each server is provided its own starting series number and an additive for calculating subsequent user identifiers. Tile flow diagram will now be described with reference to the embodiment of the system depicted in FIGS. 1 and 2.

In stage 302, each server 130 is assigned their own series number, which is stored in assignment data 216. For example, in some embodiments, a first server 130 is assigned a starting series number n. The first of servers 130 may be selected based on a variety of criteria. The first server of servers 130 may be selected randomly, in a round-robin fashion, by default, or manually by the system administrator.

The starting number n may be determined in a variety of ways. For example, the system administrator may utilize well known software tools that query the directory service for the largest or latest numeric AID that has been assigned. Such a query may be sent to each of servers 130 and the results sorted for the benefit of the system administrator. Of course, the system administrator may maintain a separate tracking mechanism, such as a file or spreadsheet, that tracks the numeric UIDs that have been assigned.

In stage 304, each subsequent server in the series is assigned their own starting series number. In some embodiments, the next server is selected randomly, in a round-robin fashion, by default, or manually by the system administrator. In addition, the starting series number may be determined by simply incrementing the initial starting series number n by a fixed amount, such as by adding 1 or a multiple of the total number of servers 130. Thus, the next server 130 in the series is assigned a series number n+1, the subsequent server 130 is assigned a series number n+2, and so forth. until the final server 130 in the series is assigned a series number n+(s−1), where s is the total number of servers 130.

Each server 130 is then assigned an additive that is also stored in assignment data 216. The additive may be any integer equal to or larger than the total number of servers 130.

In stage, 306, identifier module 216 generates unique identifiers beginning with the series number associated with server 130 as the first unique identifier, when needed. Identifier module 216 then tracks the numeric UIDs as they assigned in assignment data 216.

In stage 308, as more numeric UIDs are assigned by servers 130, identifier module 216 generates each subsequent identifier by adding the additive to the previous used numeric UID of that server 130. Thus, each of servers 130 are provided their own complimentary numeric UID that are unique.

That is, by selecting an additive greater than or equal to the total number of servers 130, it is guaranteed that identifier module 216 of each server 130 will generate identifiers that are unique throughout system 100. Moreover, selecting an additive larger than the total number of servers 130 allows additional servers 130 to be added to the system without resetting the identifiers. If additional servers are added to the system such that the total number of servers 130 is larger than the additive, identifier module 216 may be simply configured with a new additive that is larger than the total number of servers 130 and then resetting the starting sequences of servers 130 to start from a number higher than any highest previously number generated by servers 130.

Servers 130 may then be configured to synchronize with each other to distribute the numeric user identifiers they have assigned. These synchronizations may occur at regular intervals, in response to various events, etc. In addition, servers 130 may repeat the processing shown in FIG. 3 at various times. For example, when a new server has been added, the servers 130 may be reset with a new starting number and additive. The process shown in FIG. 3 may also be reset at regular intervals, for example, to ensure that servers 130 synchronize their assigned numeric user identifiers within a specified period of time. Of course, the system administrator may also manually reset the process shown in FIG. 3 at their discretion.

Figure 4:
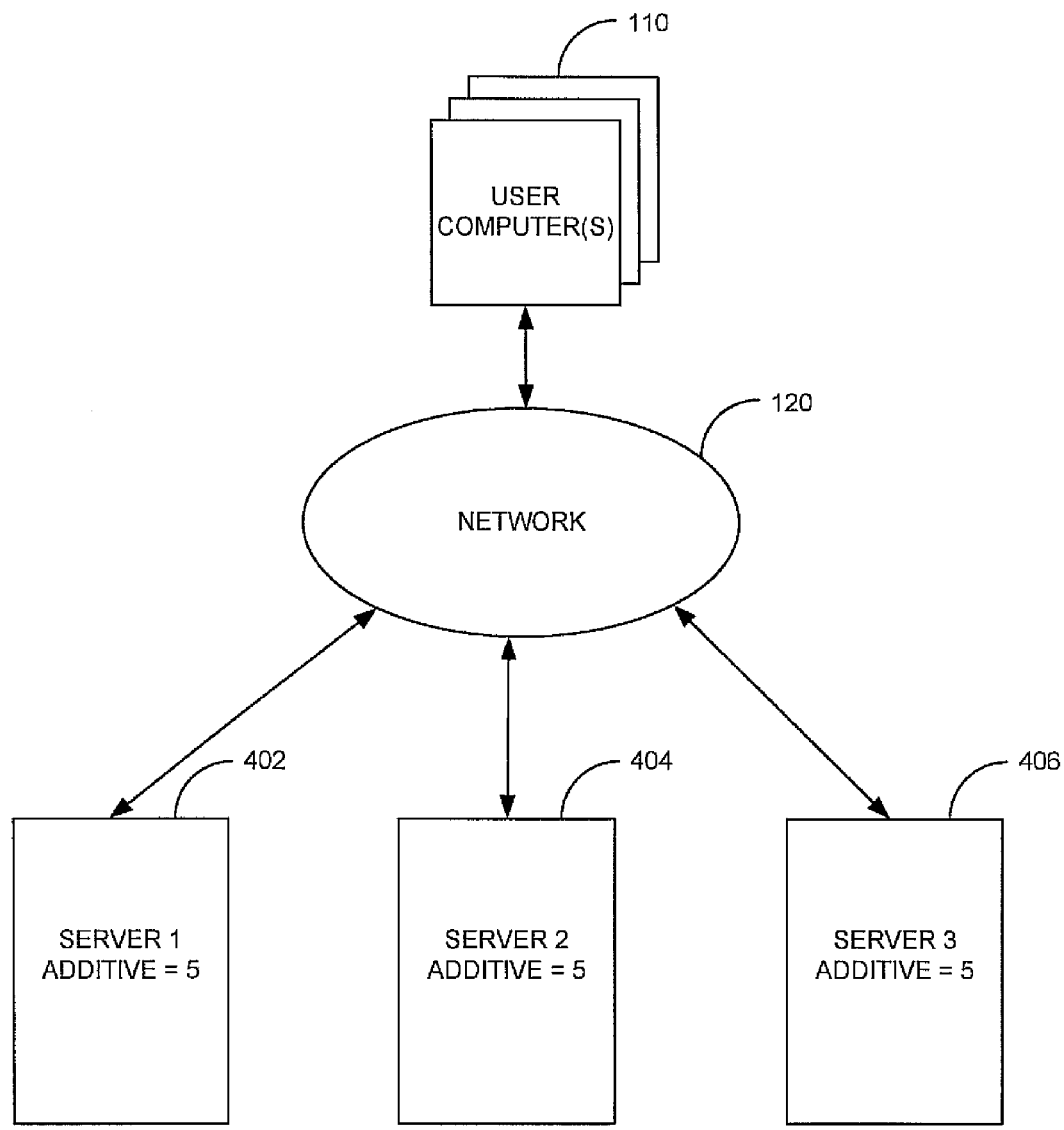
FIG. 4 depicts a block diagram of an exemplary networked computer system including three servers assigned an additive equal to 5, in accordance with systems and methods consistent with the present invention.

In order to illustrate the process flow of FIG. 3, FIG. 4 depicts a block diagram of an exemplary networked computer system including three servers assigned an additive equal to 5, in accordance with systems and methods consistent with the present invention. In this embodiment, the series begins with 1 (i.e. n=1). Thus, server 402 is assigned a series number of 1, server 404 is assigned a series number of 2, and server 406 is assigned a series number of 3. In this embodiment, the additive is 5. Thus, for server 402, identifier module (not shown) generates unique identifiers equal to 1, 6, 11, 16, etc. For server 404, identifier module (not shown) generates unique identifiers equal to 2, 7, 12, 17, etc. For server 406, identifier module (not shown) generates unique identifiers equal to 3, 8, 13, 18, etc. In this embodiment, because the additive is 5, two servers can be added to the system without resetting the series.

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   determining a number of a plurality of servers providing a multi-master directory service;
   receiving by a processing unit executing one of the plurality of servers, a first number associated with the one of the plurality of servers to represent a first identifier associated with the one of the plurality of servers, wherein the first number that is associated with the one of the plurality of servers is different from other first numbers that are associated with other servers in the plurality of servers;
   adding, by the one of the plurality of servers, the number of the plurality of servers to the first number that is associated with the one of the plurality of servers to generate a second identifier that is associated with the one of the plurality of servers, wherein the second identifier is different from other second identifiers at the other servers in the plurality of servers;
   assigning, by the one of the plurality of servers, at least one of the first identifier that is associated with the one of the plurality of servers or the second identifier that is associated with the one of the plurality of servers to at least one entity of a plurality of entities,
   wherein the at least one of the first identifier associated with the one of the plurality of servers or the second identifier associated with the one of the plurality of servers represent at least one of a user identifier or a group identifier;
   querying the plurality of servers for a largest value of an identifier that the plurality of servers have previously assigned to the plurality of entities;
   determining the other first numbers to assign to each of the other servers in the plurality of servers based on the largest value;
   selecting the one of the plurality of servers a first server; and
   assigning the other first numbers to each of the other servers based on the first number that is associated with the one of the plurality of servers.

2. wherein selecting the one of the plurality of servers is based on round-robin.

3. A server system comprising:
   a memory; and
   a processing unit couple to the memory to:
   determine a number of a plurality of servers providing a multi-master directory service,
   receive a first number associated with the one of the plurality of servers to represent a first identifier associated with the one of the plurality of servers, wherein the first number that is associated with the one of the plurality of servers is different from other first numbers that are associated with other servers in the plurality of servers;
   add the number of the plurality of servers to the first number that is associated with the one of the plurality of servers to generate a second identifier that is associated with the one of the plurality of servers, wherein the second identifier is different from other second identifiers at the other servers in the plurality of servers;
   assign at least one of the first identifier that is associated with the one of the plurality of servers or the second identifier that is associated with the one of the plurality of servers to at least one entity of a plurality of entities,
   wherein the at least one of the first identifier associated with the one of the plurality of servers or the second identifier associated with the one of the plurality of servers represent at least one of a user identifier or a group identifier;
   querying the plurality of servers for a largest value of an identifier that the plurality of servers have previously assigned to the plurality of entities;
   determining the other first numbers to assign to each of the other servers in the plurality of servers based on the largest value;
   selecting the one of the plurality of servers a first server; and
   assigning the other first numbers to each of the other servers based on the first number that is associated with the one of the plurality of servers.

4. The system of claim 3, the server system further comprising:

a network interface configured to provide the at least one of the first identifier that is associated with the one of the plurality of servers or the second identifier that is associated with the one of the plurality of servers to at least one entity.

5. The system of claim 3, wherein the first number associated with the one of the plurality of servers and received by the processing unit is independent from the second number that is associated with the one of the plurality of servers.

6. A non-transitory computer readable medium including instructions that, when executed by a processing unit, cause the processing unit to perform operations comprising:
   determining a number of a plurality of servers providing a multi-master directory service;
   receiving, by a processing unit, a first number associated with the one of the plurality of servers to represent a first identifier associated with the one of the plurality of servers, wherein the first number that is associated with the one of the plurality of servers is different from other first numbers that are associated with other servers in the plurality of servers;
   adding, by the processing unit, the number of the plurality of servers to the first number that is associated with the one of the plurality of servers to generate a second identifier that is associated with the one of the plurality of servers, wherein the second identifier is different from other second identifiers at the other servers in the plurality of servers;
   assigning at least one of the first identifier that is associated with the one of the plurality of servers or the second identifier that is associated with the one of the plurality of servers to at least one entity of a plurality of entities, wherein the at least one of the first identifier associated with the one of the plurality of servers or the second identifier associated with the one of the plurality of servers represent at least one of a user identifier or a group identifier;
   querying the plurality of servers for a largest value of an identifier that the plurality of servers have previously assigned to the plurality of entities;
   determining the other first numbers to assign to each of the other servers in the plurality of servers based on the largest value;
   selecting the one of the plurality of servers a first server; and
   assigning the other first numbers to each of the other servers based on the first number that is associated with the one of the plurality of servers.

7. A server system of clam 3, wherein selecting the one of the plurality of servers is based on round-robin.

8. A non-transitory computer readable medium of claim 6, wherein selecting the one of the plurality of servers is based on round-robin.

* * * * *

UNITED STATES PATENT AND TRADEMARK OFFICE
CERTIFICATE OF CORRECTION

| | | |
|---|---|---|
| PATENT NO. | : 8,745,106 B2 | |
| APPLICATION NO. | : 11/468475 | |
| DATED | : June 3, 2014 | |
| INVENTOR(S) | : Peter Rowley | |

It is certified that error appears in the above-identified patent and that said Letters Patent is hereby corrected as shown below:

In the claims

In claim 2, column 6, line 27, before "wherein" insert --The method of claim 1,--

Signed and Sealed this
Twenty-seventh Day of October, 2015

Michelle K. Lee
*Director of the United States Patent and Trademark Office*